Figure 1:
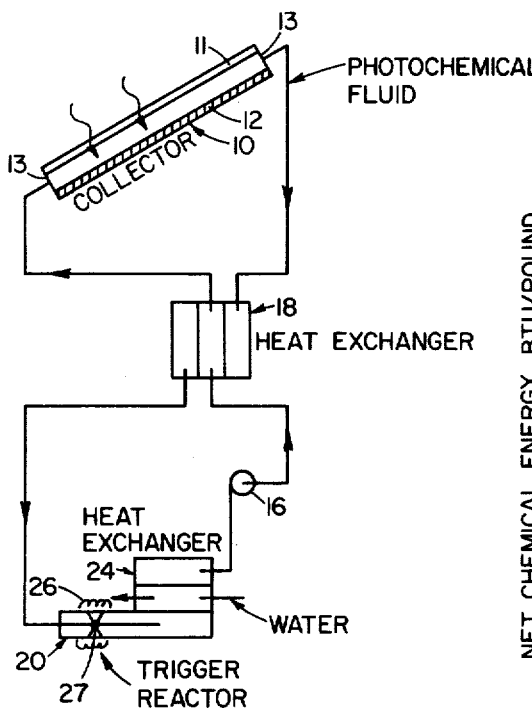

United States Patent [19]

Frieling et al.

[11] 4,004,573
[45] Jan. 25, 1977

[54] PROCESS AND APPARATUS FOR SOLAR ENERGY COLLECTION AND RETRIEVAL

[75] Inventors: Donald H. Frieling; Sherwood G. Talbert; Richard A. Nathan, all of Columbus, Ohio

[73] Assignee: Battelle Development Corporation, Columbus, Ohio

[22] Filed: Dec. 23, 1975

[21] Appl. No.: 643,829

[52] U.S. Cl. ............................. 126/271; 204/185; 237/1 A; 165/18; 165/104 M; 165/DIG. 17
[51] Int. Cl.[2] ..................................... F24J 3/02
[58] Field of Search .......... 204/185; 126/270, 271; 237/1 A; 136/89; 60/641; 165/18, 104 R, 104 M, 104 S, DIG. 17

[56] References Cited

UNITED STATES PATENTS

| | | | |
|---|---|---|---|
| 3,370,420 | 2/1968 | Johnson | 165/DIG. 17 |
| 3,558,047 | 1/1971 | Nuernberg et al. | 165/DIG. 17 |
| 3,905,352 | 9/1975 | Jahn | 126/270 |
| 3,925,212 | 12/1975 | Tchernev | 136/89 |

OTHER PUBLICATIONS

Daniels, F., "Direct Use of the Sun's Energy," 1964, pp. 299–329.

Primary Examiner—Kenneth W. Sprague
Assistant Examiner—James C. Yeung
Attorney, Agent, or Firm—Kenneth R. Warburton

[57] ABSTRACT

For collection, retrieval, and utilization of solar energy, there is taught a process and an apparatus wherein a photochemical fluid, containing an isomerizable compound, is passed through a collector for exposure to solar radiation to transform the isomerizable compound to a higher energy level isomer. The irradiated fluid leaving the collector passes in heat exchange relationship with photochemical fluid entering the collector and then proceeds into a trigger reactor means. In the trigger reactor means, higher energy level isomer in the irradiated fluid is triggered, such as by heat and/or catalyst contact, to revert to an isomerizable composition of a lower energy level isomer with exothermic release of heat in excess of that requisite for maintaining conversion of higher energy level isomer to lower energy level isomer. The trigger reactor means is positioned in close proximity and/or desirably contiguous to or an integral portion of another heat exchanger through which is flowed a material adapted for storage at an elevated temperature to receive that exothermic heat excess being released upon the higher to lower energy level isomer conversion. The photochemical fluid, after passage through the trigger reactor means and the another heat exchange means, proceeds to and through the first exchange means for passage to the collector and repetition of the just-described procedural sequence. The storable material exiting from the another heat exchanger is of elevated temperature with a sensible heat content thereof available for usage, after storage immediately, in manners known to the art for utilizing heated material in useful applications such as residential hot-water supplying and residential heating and cooling.

13 Claims, 3 Drawing Figures

U.S. Patent

Jan. 25, 1977

4,004,573

PROCESS AND APPARATUS FOR SOLAR ENERGY COLLECTION AND RETRIEVAL

RELATED APPLICATIONS

Portions of the present invention are disclosed without being claimed in pending U.S. patent applications:
Ser. No. 592,020
Filed — June 30, 1975
Inventors — Richard A. Nathan et al.
Title — "Solar Energy Collection and Retrieval Employing Reversible Photochemical Isomerization"; and
Ser. No. 592,030
Filed — June 30, 1975
Inventors — Robert E. Schwerzel et al.
Title — "Isomerization For Photochemical Solar Energy Storage";
and, although major portions of those two pending applications are repeated in the Disclosure of this present application, by this reference to those two pending applications they each are incorporated by reference in their entirety into the disclosure of this application.

This invention concerns process and apparatus system for photochemical collection, retrieval, and storage of solar energy through employment of a reversible photochemical isomerizable composition. More particularly, this invention relates to a combination of a photochemical collector and retrieval system for solar radiation with a thermal storage system, and to process and apparatus improvements and advantages provided by this combination more fully set forth in what follows.

BACKGROUND

The use of sunlight (i.e., solar energy) to supply human needs for energy is of prime importance in view of man's gradual depletion of more conventional energy sources such as fossil fuels of coal, oil, and the like.

PRIOR ART

One known approach to solar energy collection and utilization, termed herein a "conventional" thermal solar energy system, is based upon the heat produced when a blackened surface is exposed to sunlight. Such a system generally uses a solar collector of a sheet of blackened metal to heat a working fluid, typically air, water, or water-glycol mixtures. The use of flat plate collectors is preferable to the use of the parabolic type, not only because the latter is considerably more expensive, but also because flat plate collectors can more efficiently utilize diffuse radiation. In such a thermal solar system, the working fluid, e.g., water, is circulated through the collector (often over the plate, or through tubes or the like affixed to the back side of the blackened plate collector) causing the fluid to absorb sensible heat (rise in temperature). An illustrative solar energy thermal collector is an inclined non-moving flat-plate assembly comprising dual transmissive glazings with an air or gas space therebetween overlying the working fluid which flows over a black rear-surface plate. The dual glazings and air space minimize sensible heat loss from the working fluid. There are, of course, many modifications possible to such a system, but in the simplest the hot fluid then is flowed from the collector and stored in an "energy storage tank" where it is held until the energy is needed for heating or cooling purposes. At that time the hot fluid can be drawn off to run an air conditioning or heating system. During this heating or cooling process, the fluid loses a significant amount of its sensible heat (energy) and then is recirculated to the collector to pick up additional energy. The simplicity, safety, and potentially low operating cost of thermal solar energy systems already led to the commercial installation of prototype systems for applications, such as the heating of water for homes, offices, schools, libraries, and apartment complexes in some locations throughout the world.

However, a number of problems and disadvantages are inherent in a conventional thermal solar energy system. Maximum instantaneous efficiency of present-day flat-plate collectors is only up to about 40 percent. More realistically, an average daily collection efficiency on a sunny day might approach 25 percent. That is, given a solar flux capable of delivering 1.0 million Btu/day to a collector, water circulated through the collector could gain only about 0.25 million Btu/day, primarily because of optical and thermal losses. Additionally, a serious limitation to the thermal system is that the system can operate effectively only so long as there is appreciable sunlight. That is, in a thermal solar energy system there is a threshold value of light necessary before the system can be put in use. Furthermore, a thermal system often will incorporate some type of short-term heat storage such as heated water, rock, or eutectic salt mixtures to smooth out the operation of the system during the night and during cloudy periods. The cost of the thermal system, including principally the cost of the collector and insulated storage, is such that it is impractical to store more heat in this way than can operate a building's heating and cooling system for a period between several hours and a few days. As a result, there are drawbacks with thermal systems which have to operate throughout the winter in the highly populated temperature-zone climates distant from the equator, where there is both cold weather and considerable cloud cover. The collector must heat up to an operating temperature before the system can be turned on. Even on bright winter days in such climates, the system might be usable for only 5 or 6 hours each day. On cold, cloudy days, it is doubtful that a thermal solar energy system could be used at all. During such periods when the thermal solar eneergy system is unable to operate, an auxiliary energy source (e.g., electricity) needs to be available and used to supply energy for a consumer system's needs.

Photochemical conversion of solar radiation is an approach for converting solar energy into useful work. Biological photochemical processes occur naturally and are well illustrated by photosynthesis in plants and the like. Non-biological photochemical conversions also are found to some extent in nature and also have been investigated to some extent for a controlled converting and supplying of energy needs from solar energy. The photochemical approaches include the effects of solar energy on molecular dissociation, rearrangement, or chemical reaction, or the like. Such photochemical processes and conversion are described by J. G. Calvert in "Photochemical Processes for Utilization of Solar Energy", pages 190–210, in *Introduction to the Utilization of Solar Energy*, edited by A. M. Zaren and D. D. Erway, McGraw-Hill, New York, 1963, and by Farrington Daniels in Chapter 17, "Photochemical Conversion", pages 299–329, in Direct Use of the Sun's Energy, Yale University Press, New Haven and London, 1964.

Principles for Photochemical Solar Energy Collection and Retrieval

An attractive alternative to a thermal solar conversion and storage system is chemically storing the solar energy by means of a photochemical reaction which is reversible upon demand as shown by the following reactions:

Energy Collection: Photochemical and light → Stable High Energy Chemical(s)
Energy Release: Stable High Energy Chemical(s) → Photochemical plus Heat In principle, such a system can operate to some extent at any time during the daylight hours. As contrasted with the threshold behavior of thermal system, the photochemical reaction will proceed at constant efficiency as some light is present, although, of course, the extent of reaction increases with increasing sunlight. The system can be started immediately at sunrise without waiting for the collector to reach high temperature, and can be run continuously until sundown. Since the photochemical reaction will produce a product(s) with a higher energy content than that of the starting material, some of this chemically stored energy could be used immediately, in conjection with any sensible heat picked up by the material during passage through the collector. More likely the high energy product(s) which accumulate during the daylight is held in storage tank(s) until needed. In this respect such a photochemical solar energy system resembles the conventional thermal solar energy system which stores heated workin fluid except that the photochemical system would be stored at about near ambient temperature without need of insulated storage facilities to conserve the ambient heat of the stored material. In the instances where the collection step or reaction involves a chemical dissociation, the resulting dissociated products can be stored separately and upon being remixed caused to reassociate to provide the energy release. In other instances where the solar energy collection provides a single stable high energy chemical, one provides means, e.g., radiation of a specific wave length or heat, to trigger energy release therefrom and regeneration of the starting photochemical.

In that a version of a photochemical solar energy system could resemble a conventional thermal solar energy system with in each system its solar-exposed fluid being stored until energy is recovered therefrom, the costs of the fluids and the amounts of each employed and stored are of importance as to comparative commercial feasability of the two systems. For example, in a thermal system one generally would use water or a water-glycol mixture both for solar irradiation and storage. Obviously such useful aqueous fluids for a thermal system cost less than fluids in photochemical systems which of necessity include therein a light-reactive chemical which upon solar irradiation proceeds to a stable higher energy chemical(s) from which energy is releasable upon demand with the stable higher energy level chemical(s) returning to the lower-energy light-reactive chemical for subsequent solar reexposure and recycling. Partially offsetting the higher cost of the light-reactive chemical in such a photochemical system is that it can be stored at ambient or room temperature until energy release is desired therefrom, while in the conventional thermal system its aqueous fluid now heated through having picked up sensible heat from the solar irradiation, has to be stored in insulated storage means to minimize heat loss and lowering of the stored heated fluid's temperature until its thermal energy is utilized. Also partially offsetting cost of the fluid containing light-reactive chemical in such a photochemical system is that the collector of the photochemical system is that the collector of the photochemical system can be kept to a simple design and a minimum cost when only chemical energy is collected, rather than collecting thermal plus chemical energy. The simplest design for a photochemical system collector can consist essentially of two panes of glass through which the photochemical fluid is circulated. Such a design does not require optical quality and/or tempered glass. In contrast, a conventional thermal solar energy collector of a flat-plate type requires two cover plates to minimize the heat losses of the sensible heat accumulated in the irradiated fluid. Likewise to reduce optical reflection losses, the dual cover plates desirably are of optical glass or are provided with optical coatings or treatments. Should one delete or remove one of the two cover plates from such a thermal solar energy collector to reduce optical reflection losses, one also increases the heat loss from the irradiated fluid through the remaining single cover plate.

As is apparent from forthcoming publications of which this application's coinventors are coauthors thereof, which articles are scheduled to be published in *Journal of Solar Energy*, December, 1975, issue under the title "The Design Requirements For A Viable Photochemical Solar Heating and Cooling System" and in *Chemtech*, January, 1976 issue under the title "Photochemical Solar Heating and Cooling Design Criteria", for a thermal solar energy system a nonmoving, flat plate collector is the cheapest and most efficient type of collector for use in residential and office heating and cooling system. These collectors typically convert about 25 percent of the total solar radiation available on a clear day to useful thermal energy, with a maximum noontime efficiency of about 40 percent. It is worth noting that a flat plate collector utilizes not only the direct solar radiation which falls on it, but also the diffuse(scattered) radiation. Even on clear days, the diffuse component has an intensity some 15–20 percent of that of the total radiation. Generally, the collector is mounted in a tilted position, facing southward, to balance the energy inputs relative to sun angle between winter heating and summer cooling requirements.

In these articles are presented calculated daily variation in the solar radiation impinging on a tilted flat plate collector and the amount of energy transmitted through two panes of double-strength glass. These calculations are for a collector located at 32° north latitude and tilted southward at 30° above the horizontal. Most importantly, they assume clear sky conditions. On a cloudy day, the radiant flux can be as low at 10 percent of the clear sky flux. (When the tilt of the collector is roughly equal to the latitude, the daily peak solar flux is approximately equal in June and December, and reaches a maximum in March and September). The optical loss due to reflection from the glass cover plates is about 25 percent of the impinging radiant flux unless reduced with expensive optical coatings or treatments. Since the thermal system which is operated by the flat plate collector must be maintained at about 100° F above ambient temperature in order to drive the heating and air conditioning for the building, the heat loss from the collection remains essentially constant as long as the system is turned on. Removal of one cover plate to reduce the optical reflection losses would also increase the heat loss through the remaining single cover plate. As indicated in the articles, the maximum useful thermal energy at noontime on a clear June day is about 40 percent of the impinging solar flux. However, the overall daily efficiency of the collector is only about 25 percent of the total radiant flux. Hot water from the storage tank can be circulated through the collector only when the radiant flux is of sufficient magnitude to overcome the optical and heat losses. For example, in the summer the thermal collector must operate at about 200° F (93° C) to drive absorption air conditioner, whereas only about 100° F (38° C) is adequate for winter heating. Consequently, the collector can be operated for only about 6 to 7 hours per day on clear days, and less, if at all, on cloudy days.

A major advantage of a photochemical solar energy storage system over a thermal system is that in principle the chemical system can operate all day, every day, at constant efficiency. Even on cloudy or heavily overcast days, there will be sufficient light intensity to operate a photochemical system to some level. With a chemical material which has an overall conversion efficiency of 25 percent, the photochemical system can collect as much energy as a thermal system could on a clear day. On cloudy days, the photochemical system can still collect available solar flux at constant efficiency whereas the efficiency for a thermal system would decline appreciably as described above. It is further planned that the collector for a photochemical system be simpler and less expensive than that for a thermal system, as the fluid can flow in a layer between glass plates without requiring the careful bonding of tubing to the radiation-absorbing plate which is a most costly component of a thermal collector.

Ones first impression might be to consider it feasible to design a photochemical system for long-term storage and take advantage of seasonal variations in the total load. However, to store the excess energy during the spring for use in the summer would require about 16×10⁶ Btu (4.0×10⁶ kcal) in storage for typical residence. If a photochemical fluid were employed which could store 200 Btu/lb (110 cal/g), then 80,000 lbs. (36,300 kg) would be required. And if the cost of an appropriate photochemical is projected to be between 15¢ and 25¢ /lb. (33¢ -55¢ kg), this weight would represent a cost of $12,000–$20,000, which is prohibitive. Consequently, long-term storage of photochemical fluid is not an apparent commercial practicality.

The cost of the collector for a photochemical system is kept to a minimum when only chemical energy is collected, rather than thermal plus chemical energy. If one attempts to collect thermal energy also, the collector design and cost increase.

The simplest collector design for a photochemical system consists essentially of two panes of glass between which the photochemical fluid is circulated without the need for optical quality or tempered glass. The cost of this double-pane collector is estimated conservatively at $2.50/ft² ($27/m²). In an actual photochemical collector, the cost savings of using B quality and untempered glass will probably be offset by the need for fluid headers, and perhaps better seals. The overall conversion efficiency of the collector design will depend on the chemical characteristics of the photochemical fluid. A range of 25–40% conversion efficiency is within the realm of possibility for a photochemical system.

The overall design also allows for room-temperature storage of the chemical energy. To prevent excessive heat losses from the collector during the winter months, a small counterflow heat exchanger can be used between the collector and the storage tank to preheat the returning fluid with the out-going fluid. The return temperature of 65° F (18° C) from the preheater is somewhat balanced by an 85° F (29° C) return temperature from the furnace heat exchanger (not shown) in winter. During the summer months, the same heat exchanger could be used to recover the sensible heat remaining in the fluid coming from the absorption unit's generator at approximately 175° F (79° C). After preheating the circulating fluid to approximately 165° F (74° C), the stored chemical energy would be released from the photochemical fluid by an appropriate process.

To summarize, the basic cost differences between the two systems, thermal and photochemical, are in the cost of the collectors and the cost of the storage fluids. The remainder of the items are comparable; a heat exchanger, two pumps, and tank insulation in the hot water thermal system, balanced by one heat exchanger, one pump, and a diaphragm in the chemical system. Therefore, the money saved with the simpler collector design offset the cost of the more expensive photochemical fluid (as compared to water) to achieve equal cost system.

The following Table 1 gives a comparison of similar thermal and photochemical solar energy storage systems on the basis of (1) equal total present-value cost of collector plus storage and (2) for equal quantities of energy collected and stored. Thus, the values reported in Table 1 indicate breakeven points where each system's performance and present-value cost are equal, assuming clear day efficiencies for the thermal system. On cloudy days the efficiency of the chemical system will remain constant, whereas that of the thermal system will be less. Also, the stored energy content of the thermal system is much less in the summer because of the smaller useful temperature differences, whereas a chemical system will have a nearly constant energy content with the use of a preheater during summer operation. These important advantages for the photochemical system will make its actual performance better than these breakeven points indicate, or allow for tradeoffs between collector size, energy content, chemical efficiency and storage volume. However, the actual performance characteristics of any system can only be predicted by a carefully design computer analysis utilizing actual weather data for a given locality.

TABLE 1

COMPARISON OF SIMILAR THERMAL AND PHOTOCHEMICAL SYSTEMS

| System | Effic. % | Collector Area ft² | Collector Cost $ | Storage Mass lbs | Storage Cost $ | Energy Content Winter Btu/lb | Energy Content Summer Btu/lb | Remarks |
|---|---|---|---|---|---|---|---|---|
| Thermal | 25 | 650 | 2600 | 6500 | 325 | 65 | 25 | 5cts/lb; 150 F→85F, 200 F→175 F |
| Photochemical | 15.6 | 1040 | 2600 | 1300 | 325 | 335 | 135 | 25cts lb, 20-yr life |
|  |  |  |  | 950 | 325 | 455 | 181 | 25cts/lb, 10-yr life |
|  | 25 | 650 | 1625 | 5200 | 1300 | 91 | 41 | 25cts/lb; 20-yr |
|  |  |  |  | 3794 | 1300 | 121 | 53 | 25cts/lb, 10-yr |
|  | 40 | 407 | 1020 | 7620 | 1905 | 65 | 31 | 25cts/lb, 20-yr |
|  |  |  |  | 5560 | 1905 | 86 | 39 | 25cts/lb, 10-yr |
| Thermal | 35 | 465 | 1860 | 6500 | 325 | 65 | 25 | 5cts/lb, 20-yr |
| Photochemical | 21.8 | 744 | 1860 | 1300 | 325 | 335 | 135 | 25cts/lb, 20-yr |
|  |  |  |  | 950 | 325 | 455 | 181 | 25cts/lb, 10-yr |
|  |  |  |  | 1655 | 325 | 265 | 108 | 15cts/lb, 10-yr |
|  | 25 | 650 | 1625 | 2240 | 560 | 199 | 83 | 25cts/lb, 20-yr |
|  |  |  |  | 1634 | 560 | 269 | 109 | 25cts/lb, 10-yr |
|  |  |  |  | 2852 | 560 | 158 | 67 | 15cts/lb, 10-yr |
|  | 40 | 407 | 1020 | 4660 | 1165 | 100 | 45 | 25cts/lb, 20-yr |
|  |  |  |  | 3400 | 1165 | 134 | 58 | 25cts/lb, 10-yr |
|  |  |  |  | 5934 | 1165 | 81 | 37 | 15cts/lb, 10-yr |

Notes:
Stored Energy: Winter = 422,500 Btu, Summer = 162,500 Btu (based on Thermal System).
Collector Cost: Thermal = $4.00/sq ft, Chemical = $2.50/sq ft.
Chemical Mass = Cost/[1+($P_s/P_1$) 0.46319] ($P_1$). $P_1$ & $P_s$ = $0.25 and $0.20/lb, or $0.15 and $0.10/lb.
Chemical Energy Content = (Stored Energy/Mass) + 10 Btu/lb. (Energy losses require ~10 Btu/lb.)
Present-value cost of each collector and storage system in upper group = $2,925, and in lower group = $2,185.

Figure 3:
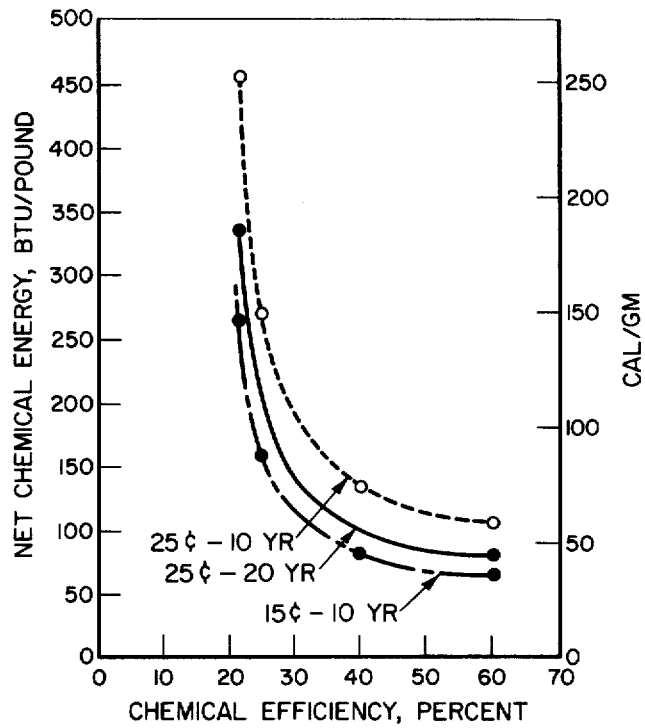

In FIG. 3 there is shown a plot of the chemical energy and efficiency required of a photochemical system to match the winter operation of a hot water thermal system. The basic thermal solar system of concern to FIG. 3 is one whose collector is 650 sq. ft. at $4/sq. ft., whose storage capacity is 6500 lbs. storage at 5¢ /lb. and which operates at 35% efficiency of the total solar radiation. Points for these curves were taken from Table 1. The area to the upper right of these curves represents conditions where a photochemical system will have advantages of lower cost or better performance. It should be remembered, however, that the actual performance of a chemical system will be somewhat better than these breakeven curves indicate, because of better cloudy day performance and greater summer energy storage.

The curves in FIG. 3 indicate that in providing a photochemical fluid (to be competitive with a hot water thermal system) chemical efficiency can, to some extent, be traded off against energy storage capability. However, there are limits. Even with the highest reasonable storage capacity a minimum chemical efficiency of over 20% is necessary, and even with very high efficiency a minimum storage capacity of about 65 Btu/lb (36 cal/g) is necessary. In addition, the curves show that not much is gained by achieving efficiencies greater than 60%.

It is taught in the already mentioned forthcoming journal articles of the inventors a photochemical solar energy heating and cooling system can provide the advantages of lower cost and/or better performance than a thermal solar energy system. To achieve these advantages, a photochemical fluid is employed which: (1) converts more than 20% of the available solar energy to stored chemical energy, and (2) has an energy storage capability exceeding 158 Btu/lb (88 cal/g) at 25% conversion efficiency, or 81 Btu/lb (45 cal/g) at 40% efficiency. Of course these requirements for the photochemical fluid are based on a clear day operation of the compared two systems and also specific design parameter set forth in the journal articles.

However, the foregoing and also the contents of the journal articles establish upon comparison of a thermal solar energy system and a photochemical solar energy system, wherein the irradiated photochemical fluid is stored and then subsequently has useful energy retrieved therefrom, that the photochemical system has several important advantages over the thermal system, such as (1) lower cost collector, (2) smaller storage tank, (3) room temperature storage, (4) cloudy-day effectiveness (operates everyday, all day, with constant conversion efficiency) and (5) stored energy available at constant energy level, winter and summer. Possible disadvantages in a photochemical system are: (1) higher cost of fluid (which can be offset by a cheaper collector), (2) time decay, or degradation, of the chemical properties and (3) constraints related to fire and health hazards.

DRAWINGS

In the drawings:

FIG. 1 presents partially in schematic and partially in diagrammatic format the invention's apparatus and fluid circulatory system, which includes in combination a photochemical solar energy collector, heat exchangers, and a trigger-reactor means.

Figure 2:
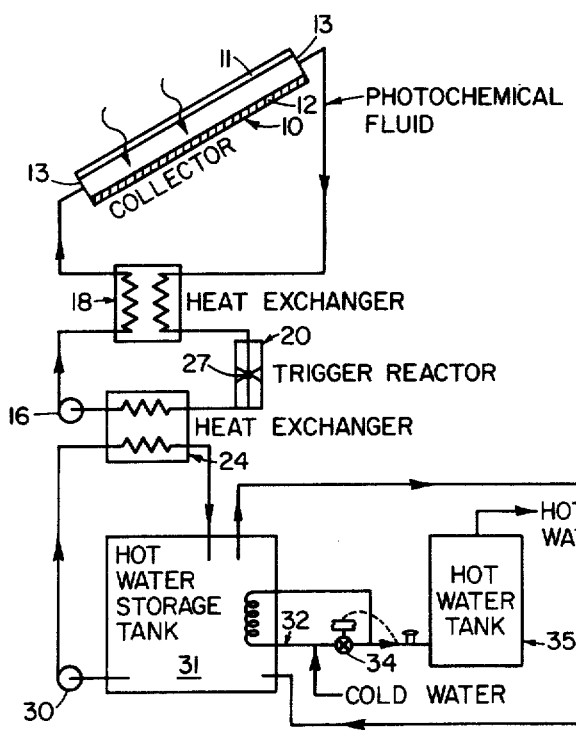

FIG. 2 presents in diagrammatic format the apparatus and system of FIG. 1 as utilized in an overall system of utility for residential and the like, heating and cooling and supplying of hot water.

FIG. 3 presents a plot of the chemical energy and efficiency requisite for a photochemical solar system to match the winter operation of a hot water solar system of prespecified collector cost, storage capacity and efficiency.

SUMMARY STATEMENT OF THE INVENTION

In the present invention a photochemical isomerizable composition, while contained, e.g. dissolved and/or dispersed, in a fluid, e.g. water or an aqueous liquid medium, is exposed to solar radiation and is responsive photochemically to solar energy, preferably responsive in the visible light and near-infrared spectrum (i.e., between 350 and 1200 nm), to form an isomer of higher energy content. After its formation, the higher energy isomer is used to retrieve energy therefrom and this retrieved energy stored by another means such as its thermal energy being heat-exchanged to a storable material, such as fluid medium e.g. water, for storage as sensible heat or the like. In retrieval of the stored solar energy, the isomeric form of higher energy content is "triggered" by heat and caused to revert and return to its original and initial isomeric form of lower energy content with an accompanying exothermic release of heat. A portion of this recovered heat is employed to continue the triggered conversion to the lower energy level isomer. Substantially all of the remaining heat is retrieved stored as sensible heat for later usage, or converted to another energy form for storage. Upon return of the isomerizable composition to its isomeric form of lower energy content, the isomerizable composition is available for re-exposure to solar energy and its conversion again to its isomeric form of higher energy content and with repetition of the precedingly described procedural sequence of collection, storage, and retrieval of its stored energy. The present invention advantageously passes fluid containing isomerizable composition, which is being returned for re-exposure to solar energy, in heat exchange relationship with solar-irradiated fluid to transfer sensible heat thereto, and thus decrease the initial heat input required to be supplied to initiate the conversion as well as enabling more efficient and greater recovery of sensible heat from the fluid after conversion. Conversion of the higher energy level isomer to its lower energy level isomer can be initiated and/or triggered through an initial application of heat thereto and/or exposure to catalysts, after which the reverse isomerization being exothermic is self-sustaining with there obtained a release of heat in excess of that heat needed to sustain the reverse isomerization. Certain catalysts can be used to initiate and facilitate the reverse isomerization of the photochemical isomerizable compositions.

DETAILED STATEMENT OF THE INVENTION

With reference to drawing FIGS. 1 and 2 wherein the same number identifies the same component or element, the heart and principal of the invention's process and apparatus are illustrated in FIG. 1. Solar radiation, indicated by wavy-shaft arrows not numbered, strike a collector, generally designated 10, disposed at an inclined angle to a horizontal plane, the specific angle being dependent on the season and geographical location of the apparatus for efficient operation. Collector 10 comprises an upper light-transmissive panel 11 or sheet, such as of a B-grade untempered glass, and a backing panel 12 which can be of an opaque glass, a plastic panel, aluminum sheet or the like. Spacing between upper panel 11 and backing panel 12 is in the order of a few millimeters, generally between 1 and 10 mm., and preferably about 5 mm. Smaller spacings are impractical with it observed that a 1 mm. thickness of photochemical fluid is adequate to provide take up of a significant portion of the total solar energy reaching the collector. Larger spacings only increase the amount of photochemical fluid required overall in the system without significantly increasing the amount of solar radiation taken up by the photochemical fluid. Solar radiation passes through panel 11 and strikes the photochemical fluid, which contains therein an isomer of an isomerizable compound which isomer is capable of and undergoes isomerization to a higher energy level isomer upon exposure to the solar radiation. Collector 10 has its spaced-apart panels 11 and 12 closed by walls, designated 13, with conduits through end walls 13 for passage of photochemical fluid into collector 10 over panel 12 and out of collector 10. The photochemical fluid forcibly is flowed into the collector 10, most conveniently, with the lowermost level of collector 10 and upwards between panels 11 and 12 at a flow rate, depending on the intensity of solar radiation providing radiation adequate to isomerize a significant portion, generally at least one half of the lower isomer content, of the isomerizable isomer therein to its higher energy level isomer, but not necessarily at such a slow rate or for such a lengthy solar radiation exposure so as to change all isomer to its higher energy level isomer or to convert an amount of the isomer adequate to provide the equilibrium level ratio of the two isomers, such as can be observed generally in cis and trans isomer mixtures after prolonged solar exposure thereof.

A pump 16 forcibly moves photochemical fluid containing lower energy level isomer (e.g. trans isomer) through a conduit into and through a heat exchanger 18 before this fluid proceeds by conduit into the lowermost level of collector 10. Solar irradiated photochemical now containing higher energy level (e.g. cis isomer) exits from the highermost level of collector 10 and proceeds by conduit to heat exchanger 18 wherein exchange of sensible heat occurs between the incoming and outgoing photochemical fluid, into and from collector 10, respectively.

From heat exchanger 18 the photochemical fluid containing higher energy level isomer passes by conduit to a trigger reactor means, generally designated 20. In FIG. 1, trigger reactor means 20 is shown to be contiguous with a second heat exchanger 24, although it equally well alternatively could be shown as an integral portion of heat exchanger 24. In FIG. 2, trigger reactor means 20 alternatively is shown in close proximity to heat exchanger 24 so as to minimize the distance and time of flow of photochemical fluid from trigger reactor means 20 to heat exchanger 24. Such locating serves to minimize and avoid heat loss from an exothermic conversion carried forth in the trigger reactor means 20. Photochemical fluid containing higher energy level isomer, while within the trigger reactor means 20, has higher energy level isomer converted back to lower energy level isomer and in so converting there is generated an exothermic production of heat. In FIG. 2 the trigger reactor means 20 includes an electric heating means 26 and also a catalytic triggering means 27. Thus, within trigger reactor means 20 the conversion of higher energy level isomer (e.g. cis isomer) to lower energy level isomer (e.g. trans isomer) can be initiated and/or sustained by heat triggering, catalytic triggering, light triggering, a combination thereof, or like triggering means. A principle of the present invention is that the amount of exothermic heat produced when the higher energy level isomer converts to the lower energy level isomer is an amount of produced heat in excess of that heat required to continue heat conversion of additional higher energy level isomer to lower energy level isomer, so that the conversion reaction is and can be self sustaining once it has been initiated by heat, catalysis, or the like means. Conveniently this is accomplished by an initial heat input and/or catalyst contact with a small volume of the cis isomer to a point that isomerization reverses and becomes self-sustaining (i.e. cascades) with more heat being released in the reverse reaction than is needed to sustain it and with the flow of irradiated photochemical fluid into the trigger reactor then controlled or regulated as to sustain and continue the conversion of higher energy level isomer to lower energy level isomer. Alternatively, the reverse reaction can be sustained by catalyst contact.

In illustrated heat exchanger 24 there is passed therethrough a storage fluid, which as illustrated is water, to take up by increase of temperature of this passing storage fluid of heat produced in the just-described trigger reactor means in excess of that requisite to sustain the reverse reaction. Water is the most economical storage fluid to employ and generally will be employed, although other fluids may be useful. The storage fluid (e.g. water) enters heat exchanger 24 at a lower temperature than which it exists with its flow adapted to so provide depending upon the specific amount of exothermic heat produced in trigger reactor means 20 in excess of that to sustain the reverse isomerization reaction.

As shown in FIG. 2, a pump 30 is used to forcibly move the storage fluid from a hot water storage tank 31 through heat exchanger and back to tank 31. This storage tank in practice is suitably insulated, although insulation is not illustrated, to avoid heat losses from the stored hot water.

The hot water in storage tank 31 then is employable in the same manner stored heated water or water-glycol mixtures from conventional thermal solar systems are used for useful purposes, such as residential heating and cooling. The balance, not-described-yet portion, of FIG. 2 illustrates such a possible application and system and employment of heat from the hot water in storage tank 31. For providing a supply of heated water for household or other purposes, provision is made for introducing cold water into a conduit circuit 32 which proceeds in a coiled relationship for heat exchange purposes through storage tank 31 and through a thermostatically controlled valve 34 for mixing to achieve a desired elevated temperature and then for introduction into a hot water tank 35 from which hot water can be drawn for usage as desired. In FIG. 2 provision also is made for a pump to remove hot water from hot water storage tank 31 and to pass the removed hot water through an auxiliary heater means, generally designated 38 from where the heated water, as desired, can be circulated through heating coil means over which room air or the like can be circulated by a not-illustrated fan for providing a source of heated room air for residential heating purposes. As desired by operation of valve 40, instead of employing the hot water from storage tank 31 for heating purposes, one may pass it through an absorption refrigeration system 41 to cool room air for residential cooling purposes. As illustrated, absorption refrigeration system includes a cooling tower 42.

In the event, that environmental conditions are such that an inadequate supply of heat is available from the water circulated from hot water storage tank 31 to operate at a desired or requisite temperature the particularly operated heating coil means 39 or absorption refrigeration means 41, then one activates the auxiliary heater means 38 to increase the sensible heat of the water being so circulated. As illustrated this auxiliary heater 38 is an electrical heater, but gas, coal, oil or like heating means also could replace the illustrated means and serve as the auxiliary heating means if desired. In the event that conditions so warrent, there is provided a valve 43 so that the water circulated through the heating coil means 39 or absorption refrigeration means 41 bypasses any circulation through hot water storage tank 31 with auxiliary heater 38 in such instance functioning as the prime heating means and with the aforedescribed photochemical collection storage and retrieval system providing from little to none of the energy for heating or cooling in the overall system illustrated in FIG. 2.

As mentioned earlier, a thermal triggering (or conversion) of the cis-isomer to the trans-isomer can be promoted through the employment of a catalyzed heat triggering or conversion or also employment of a catalytic amount of light. A catalytic triggering effectively lowers the requisite activation energy for the cis-to-trans-isomer conversion and simplifies whatever heat-triggering means one employs in the invention. Thus, photochemical isomerizable materials which ordinarily can require a high temperature (i.e., considerable heat initiation) can in principle be heat triggered at a much lower temperature, and in some instances at ambient temperature or only slightly higher than ambient temperature when the cis-isomer is brought into contact with a requisite catalyst. Likewise, where the heat conversion from cis-isomer to trans-isomer can in some instances extend over a period of days, the presence of the appropriate and requisite catalyst can greatly increase the speed of conversion. Thus, employment of a catalytic heat conversion provides a significant advantages in reduction of heat to the cis-isomer to effectuate its conversion as well as increasing the speed and/or providing means for control of the rate of conversion of cis-isomer to trans-isomer.

Employing a geometrical isomerizable compound and conversion, the property of activation energy of the employed cis-isomer no longer need by restricted by the temperature required for purely thermal triggering, but now can be as high as 40–45 Kcal/mole and possibly higher. Materials which function as useful catalysts to initiate or induce release of energy from the cis-isomer at a temperature requisite in the absence of the catalyst material are characterized by the presence of strongly acidic moieties, either present as defect sites in the crystal structure of the catalyst or present as molecular groups chemically bound to the catalyst. These acidic moieties can be either Lewis acids or proton acids. The following Table 1 presents an illustrative and representative list of catalysts meeting these requirements to define the class of catalysts useful in the invention.

TABLE 1

| Effective Catalysts |
|---|
| Metal oxides having Lewis acid properties, such as alumina, lead oxide, zinc oxide, and silicon oxide. |
| Metals having acidic surface sites, such as zinc metal. |
| Protonated (hydrated) forms of the above materials. |
| Mineral acids and organic acids stronger than acetic acid; the organic acids may include the following structures |

TABLE 1-continued

Effective Catalysts

R—SO₃H      R—CO₂H where R = aryl, alkyl, substituted alkyl, substituted aryl, or polymer, and R is of such a size that the organic acid is insoluble in the liquid medium containing the photochemically active material.

Any combination of any two or more of the above catalysts.

---

The catalytic materials of the above-defined class especially are effective with the useful photochemical compound taught in the aforementioned U.S. patent application, Ser. No. 592,029.

Each of the catalysts in this class obviously can and is contemplated as capable of being useful when incorporated into a triggering or conversion means in any of a wide variety of geometrics, such as in the form of grids, baffles, concentric tubes, coatings, pellets, and the like, which then can be included within a trigger reactor. As specific examples and representative and illustrative of the useful catalysts, there are neutral deactivated alumina, barium oxide (BaO), lead oxide (PbO), molybdenum oxide ($MoO_3$), TLC grade silica gel, zinc oxide (ZnO), granular cleaned zinc metal, and 4-toluene-sulfonic acid, and mixtures thereof. Likewise, as illustrative of materials ineffective as catalysts in practice of the invention, there are neutral activated alumina, granular aluminum metal, antimony oxide ($Sb_2O_3$), cadmium oxide, calcium oxide (CaO), cobalt oxide ($Co_2O_3$), copper oxide ($Cu_2O_3$), granular iron metal, iron oxide ($Fe_2O_3$), pelleted lead metal, magnesium oxide (MgO), nickle oxide (niO), and granular tin metal.

This invention's process contemplates employment of those photochemical fluids which contain therein at least one of the geometric isomerizable compounds taught as useful in the aforementioned U.S. patent application Ser. No. 592,029 or which contain therein at least one of the valence isomerizable compositions taught in the aforementioned U.S. patent application Ser. No. 592,030. As taught in the aforementioned applications, the employed isomerizable compound or compositions are dissolved and/or dispersed in a liquid medium (preferably water or a predominantly aqueous liquid medium) although in some instances the liquid medium may comprise organic liquids.

The useful geometrical isomerizable compounds from application Ser. No. 592,092 possess the following properties:

1. The compound will undergo a geometrical isomerization, upon the exposure to light of wavelengths between 350 nm and 1200 nm, from a thermodynamically stable isomer of lower energy content (herein referred to as T) to a thermodynamically less stable but kinetically stable isomer of higher energy content (herein referred to as C);
2. The absorbance maximum of C occurs at shorter wavelengths than that of T;
3. The absorbance maximum of T lies within the range 350 nm to 800 nm;
4. The ground-state enthalpy content of C is at least 10 Kcal/mole greater than that of T;
5. C can be made to revert back to T by means of a thermal initiation, which may be catalyzed or uncatalyzed, such that in doing so the higher enthalpy content of C will be released in the form of heat;
6. The activation energy for the thermal reversion of C to T is at least 20 Kcal/mole.

The compound further is characterized by a rigid linkage connecting structural moieties, which in combination with the linkage, are adaptable to undergoing geometric isomeric conversion as noted by the illustrated overall gross structures thereof of

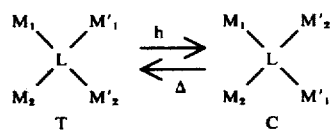

wherein L is the rigid linkage, which may be carbon-carbon double bond or several such bonds, a carbon-nitrogen double bond or several such bonds, a cyclopropane or cyclobutane ring system, or a combination of these linkages; $M_1$, $M_2$, $M_1'$, and $M_2'$ are structural moieties which may be hydrogen, alkyl, aryl, or heteroaromatics; $M_1$ and $M_2$ (or $M_1'$ and $M_2'$) together may also be an aromatic or heteroaromatic ring system. Illustrations of, but not limited to, are the examples below:

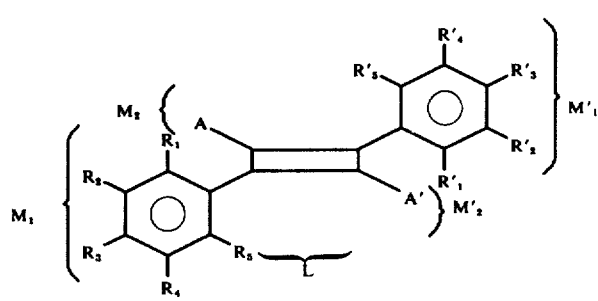

wherein

A and A' may be H, alkyl, or aryl, $R_1$, $R_1'$, $R_5$, and $R_5'$ may be H, alkyl, alkoxy, $SO_3$ or some combination of these groups, $R_2$, $R_2'$, $R_4$, and $R_4'$ may be H, alkyl, alkoxy, $NX_3$ (where X is H or alkyl), $SO_3^-$, halogen, or some combination of these groups, $R_3$ and $R_3'$ may be H, alkyl, aryl, aroyl, alkoxy, aryloxy, nitro, amino, dialkylamino, or some combination of these groups, and $R_1$ and $R_2$ (or $R_1'$ and $R_2'$) together, or $R_2$ and $R_3$ (or $R_2'$ and $R_3'$) together, or $R_3$ $R_4$ (or $R_3'$ and $R_4'$) together, or $R_4$ and $R_5$ (or $R_4'$ and $R_5'$) together may be an aromatic ring system either carbocyclic or heterocyclic;

and

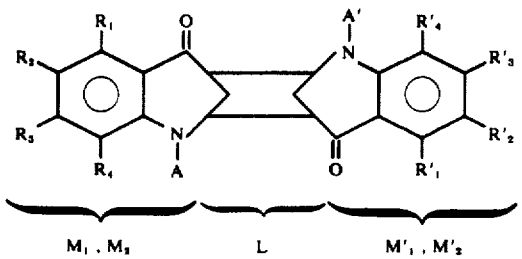

$M_1, M_1$   $L$   $M'_1, M'_2$ wherein

A and A' may be a $C_2$ or higher lower alkyl, haloakyl, alkoyl, haloalkoyl, aryl, haloaryl, aroyl, heteroaroyl, $-SO_2$—haloalkyl, $-SO_2$—aryl, $-SO_2$—haloaryl, or $$\underset{Y}{CON-X}$$

(wherein X and Y may be H, alkyl, aryl, or a combination of these three), or a substituted aroyl wherein the substituents may be nitro, alkoxy, aroyloxy, sulfinyl, carboxy, dialkylamino, halo, or combination thereof; $R_1$, $R_1'$, $R_2$, $R_2'$, $R_3$, $R_3'$, $R_4$, and $R_4'$ may be H, alkyl, aryl, alkoxy, aryloxy, halogen, $SO_3^-$, $NX_3^+$ (where X is H or alkyl), alkoyl, aroyl, or a combination of these groups; and $R_1$ and $R_2$ (or $R_1'$ and $R_2'$) together or $R_2$ and $R_3$ (or $R_2'$ and $R_3'$) together, or $R_3$ and $R_4$ (or $R_3'$ and $R_4'$) together may be an aromatic ring system either carbocyclic or heterocyclic.

More particularly of these useful geometrical isomerizable compounds each is an organic compound (a) which is selected from the several classes of compounds of:
  indigo and thioindigo derivatives;
  modified indigo and thioindigo derivatives;
  stilbene derivatives;
  cyanine-type dyes; and
  modified aromatic olefins;
and (b) which possess the properties and meets the general gross structural requirements aforedescribed.

Encompassed within and illustrative of these geometrical isomerizable compounds, to name a few, are:
  N,N'-diacetylindigo
  N,N'-dibenzoylindigo
  N,N'-dipivaloylindigo
  N,N'-bis-(1-adamantoyl)indigo
  N,N'-bis-4-trifluoromethylbenzoyl)indigo
  N,N'-bis-(2-methoxybenzoyl)indigo
  N,N'-bis-(1-naphthoyl)indigo
  N,N'-bis-(2-furoyl)indigo
  N,N'-bis-(cyclohexylcarbonyl)indigo
  N,N'-bis-(2-chlorobenzoyl)indigo
  N,N'-bis-(2,4-dichlorobenzoyl)indigo
  N,N'-bis-(2,5-dimethylbenzoyl)indigo
  N,N'-bis-(2,4,6-trimethylbenzoyl)indigo
  N,N'-bis-(4-chlorobenzoyl)indigo
  N,N'-bis-(3-chlorobenzoyl)indigo
  N,N'-bis-(3,4-dichlorobenzoyl)indigo
  N,N'-bis-(2,3,6-trichlorobenzoyl)indigo
  N,N'-bis-(4-bromobenzoyl)indigo
  N,N'-bis-(4-fluorobenzoyl)indigo
  N,N'-bis-(4-methoxybenzoyl)indigo
  N,N'-bis-(3,5-dimethoxybenzoyl)indigo
  N,N'-bis-(2-ethoxybenzoyl)indigo
  N,N'-bis-(3,4-methylenedioxybenzoyl)indigo ("dipiperonoylindigo")
  N,N'-bis-(2,6-dimethoxybenzoyl)indigo
  N,N'-bis-(3-methylbenzoyl)indigo
  N,N'-bis-(4-methylbenzoyl)indigo
  N,N'-bis-(2-phenylbenzoyl)indigo
  N,N'-bis-(4-t-butylbenzoyl)indigo
  N,N'-bis-(3-trifluoromethylbenzoyl)indigo
  N,N'-bis-(3,5-ditrifluoromethylbenzoyl)indigo
  N,N'-bis-(2-benzoylbenzoyl)indigo
  N,N'-bis-(4-nitrobenzoyl)indigo
  N,N'-bis-(3-nitrobenzoyl)indigo
  N,N'-bis-(3,5-dinitrobenzoyl)indigo
  N,N'-bis-(2-chloroj025-nitrobenzoyl)indigo
  N,N'-bis-(5-chloro-2-nitrobenzoyl)indigo
  N,N'-bis-(2-chloro-4-nitrobenzoyl)indigo
  N,N'-bis-(3-carboxybenzoyl)indigo
  N,N'-bis-(4-carboxybenzoyl)indigo
  N,N'-bis-(3,4-dicarboxybenzoyl)indigo
Thioindigo
  6,6'-Diethoxythioindigo
  4,4'-Dichloro-6,6'dimethylthionindigo
  6,6'-Dichloro-4,4'-dimethylthioindigo
  5,5',7,7'-Tetramethylthioindigo
  4,4',7,7'-Tetramethyl-5,5'-dichlorothioindigo
  perinaphthothioindigo
  N,N'-diacetylperinaphthothioindigo
  N,N'-dibenzoylperinaphthothioindigo
  N,N'-dipivaloylperinaphthothioindigo
  hemiperinaphthothioindigo
  N,N'-diacetylperinaphthothioindigo
  N,N'-dibenzoylperinaphthothioindigo
  N,N'-dipivaloylperinaphthothioindigo
Stilbene
  4-Methoxystilbene
  4-Dimethylaminostilbene
  4-Nitrostilbene
  4-Nitro-α-methylstilbene
  4-Nitro-4'-methoxy-α-methylstilbene
  4-Nitro-4'-methoxystilbene
  4-Nitro-4'-dimethylaminostilbene
  2,4-Dinitro-4'-dimethylaminostilbene
  4,4'-Stilbenedicarboxylic acid
  4,4'-Diphenylstilbene
  1,2-Bis(1-napththyl)ethylene
  1,2-Bis(2-naphthyl)ethylene
  1-(2-Methoxy-1-naphthyl)-2-(1-naphthyl)ethylene
  1-(4-Methoxy-1-naphthyl)-2-(1-naphthyl)ethylene
  4,4'-Dinitro-2,2'-stilbenedisulfonic acid, disodiur salt
  4,4'-Diamino-2,2'-stilbenedisulfonic acid
  4-Dimethylaminostilbene, hydrochloride salt
  3,3'-Diethyloxacyanine iodide
  3,3'-Diethyloxathiacyanine iodide
  3,3'-Diethylthiacarbocyanine iodide
  2-(p-Diethylaminostyryl)-pyridylmethyl iodide
  1,1'-Diethyl-2,2'-pyridylcyanine iodide
  5-(1'-Ethyl-4'-quinolinylidene)-3-ethylrhodanine
  2,4-Di-(p-dimethylaminostyryl)-pyridylethyl iodide
  3-Methyl-3'-ethyloxathiacarbocyanine iodide
  2-(p-Dimethylaminostyryl)-quinolylethyl p-tosylate
  3,3'-Diethyl-9-methylthiacarbocyanine bromide
  3,3'-Diethyl-9-ethylthiacarbocyanine p-tosylate
  3,3'-Dimethylthiacarbocyanine iodide
  3,3'-Diallylthiacarbocyanine bromide
  1,1'-Diethyl-2,2'-carbocyanine chloride 3,3'-Diethyl-9-methyl-4,5,4',5', dibenzthiacarbocyanine bromide
1,3'-Diethyl-2,2'-quinolylselenacarbocyanine iodide
1,1'-Diethyl-4,4'-cyanine iodide
1,1'-Diisoamyl-4,4'-cyanine iodide
1,1'-Diethyl-2,2'-carbocyanine bromide
1,1'-Diethyl-2,2'-carbocyanine iodide
3,3'-Diethylthiadicarbocyanine iodide
3,3'-Diethylthiatricarbocyanine iodide
1,1'-Diethyl-2,2'-tricarbocyanine iodide
1,1'-Biindanylidene
1,1-Biaciidanylidene The useful valence isomerizable compositions from application Ser. No. 592,030 organic compounds, are analogues and/or derivatives of known valence isomerizable compounds in that each includes in its molecular structure two reactive carbon-to-carbon double bounds, conjugated or unconjugated, oriented in such relation to each other that under irradiation there occurs an intramolecular cyclization to a strained ring molecular structure of higher energy content, and these valence isomerizable organic compounds include in their molecular structure at least one chromophoric moiety selected from the group consisting of dihydroparaquinone moeities, orthoquinone moiety, trans- and cis- -aminoenone moieties, and mixtures thereof with inclusion of the foregoing moieties in an amount adapted to provide maximum light absorbance between 350 and 800 nm for the valence isomerizable compound. Structurally these moieties are illustrated as follows:

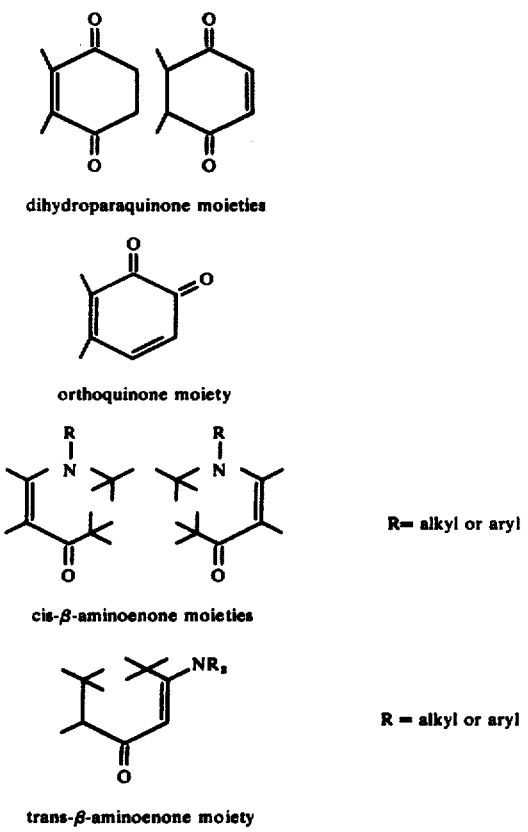

dihydroparaquinone moieties orthoquinone moiety

R= alkyl or aryl cis-β-aminoenone moieties

R = alkyl or aryl trans-β-aminoenone moiety

Encompassed within and illustrative of these valence isomerizable compositions, to name a few, are:

1,4,5,8-tetra-t-butyl-2,3-dihydronaphthalene-2,3-dione;
B-(2,3-quino-2'-[2.2]paracyclophanecarbonyl)propionic acid;
2,3,2',3',-diquino[2.2]paracyclophane;
5,8,5',8'-tetraketo-1,4,1',4'-naptho-[2.2]cyclophane
3-diethylamino-3a,4,7,7a-tetrahydro-4,7-methanoindene-1-one;
3-bis-(4-methoxyphenyl)amino-3a,4,7,7a-tetrahydro-4,7-methanoindene-1-one;
2,3,6,7-tetradiethylamino-1,4,5,8-tetrahydro-1,4,5,8-tetra-oxocyclobutadibenzene; and
2,3,6,7-tetra-[bis-(4-methoxyphenyl)amino]-1,4,5,8-tetrahydro-1,4,5,8-tetraoxocyclobutadibenzene.

In summary, the process and apparatus of the invention in comparison to a conventional thermal solar energy system provides the advantages of a lower cost collector, sunrise to sunset operation, a higher cloudy day effectiveness, an efficiency independent of ambient temperature and apparently no specifically added antifreeze additive required while subject to disadvantages of some additional safety design considerations in view of the particularly employed photochemical and the cost of the photochemical and additional hardware. The process and apparatus of the invention in comparison to a photochemical system version, wherein the solar-irradiated photochemical fluid is stored for a prolonged period before energy is retrieved therefrom, provides the advantages of requiring a much smaller quantity of the photochemical fluid with accompany lower cost thereof and fewer safety constraints in view of the smaller employed quantity, significantly decreases importance of any chemical leakage via the reverse reaction of the higher enery level isomer (e.g. cis isomer) to the lower energy level isomer (e.g. trans isomer) in that the storage stability of the higher energy level isomer need only exist for the length of time required to convey the irradiated photochemical fluid from the collector to the trigger reactor means, energy capacity in less important with isomerizable compounds and compositions of lower energy storage capacity now useful, and the system has retrofit capabilities with major portions of a conventional solar energy system, while subject to disadvantages of slightly decreased energy storage in the summer season and requiring an insulated storage tank for a hot stored fluid (e.g. hot water).

Although the invention has been described, taught, and disclosed herein with specificity, it is to be understood that the foregoing disclosure is to be deemed merely illustrative of the invention with various changes in details, materials, and procedures being obvious and possible and being within the skill of one skilled in the art and with all such obvious changes falling within the true scope and meaning of the invention insofar as they are encompassed within the scope of the invention expressed in the appended claims.

We claim:
1. For collection, retrieval, and utilization of solar energy, a process comprising the steps of:
 a. exposing to solar radiation an isomer of an isomerizable compound contained in a fluid within a collector means adapted for transmission of the solar radiation to the fluid, which isomer is capable of and undergoes isomerization to a higher energy level isomer upon said exposing to the solar energy;

b. passing the fluid, now containing higher energy level isomer, from the collector means into and through a first heat exchanger to elevate its temperature by transfer thereto of sensible heat from the fluid containing the isomer subsequently flowed into and through the collector means for said exposing;

c. flowing the fluid, containing the higher energy level isomer and now at an elevated temperature, from the first heat exchanger into a trigger-reactor means capable of initiating and maintaining and which initiates and maintains conversion of the higher energy level isomer to the isomer with exothermic release of thermal energy in excess of an amount of thermal energy requisite for maintaining the conversion;

d. concurrently and/or immediately subsequent to said conversion, passing the fluid within the trigger-reactor means into and through a second heat exchanger to transfer sensible heat therefrom and to elevate the temperature of a material adapted for storage at an elevated temperature until desiring sensible heat thereof for a useful purpose; and, e. after passing through the second heat exchanger, passing the fluid through the first heat exchanger to transfer sensible heat therefrom to the fluid containing higher energy level isomer before the subsequently flowing of the fluid into the collector means for said exposing.

2. The process of claim 1 in which passing and flowing of the fluid is by pumping of the fluid.

3. The process of claim 2 wherein the employed fluid comprises water and geometric isomer.

4. The process of claim 2 wherein water is the material adapted for storage at an elevated temperature of sensible heat.

5. The process of claim 1 in which the initiating of the conversion of the higher energy level isomer to the isomer is provided by supplying auxillary heat imput into the trigger-reaction means in an amount requisite to initiate the conversion and in which there is discontinued supplying of the auxillary heat imput upon the conversion reaching a self-sustaining reaction with exothermic release of thermal energy is excess of an amount requisite to maintain conversion of the higher energy level isomer flowing through the trigger-reactor means.

6. Apparatus, including circulatory system, for collection, retrieval, and utilization of solar energy through employment of a photochemical isomerizable compound contained in a fluid, which apparatus comprises:

a. a solar energy collector means having an entrance and exit and adapted for flow therethrough of the fluid containing an isomer of the photochemical isomerizable compound and adapted for transmission of solar radiation through a transparent portion thereof to irradiate the fluid for isomerizing the isomer to a higher energy level isomer;

b. a first heat exchange means including a conduit for flow of fluid therethrough and connecting it to said entrance and exit of the solar energy collector means, and adapted for fluid containing the isomer to flow therethrough and into the entrance of the solar collector means and to have sensible heat thereof transferred to fluid containing the higher energy level isomer flowing from said solar energy collector and through the first heat exchanger means;

c. a trigger reactor means connected to the first heat exchange means and adapted to receive therefrom a flowing fluid containing the higher energy level isomer now at an elevated temperature and adapted to initiate and convert the higher energy level isomer to the isomer with exothermic release of thermal energy upon flowing the fluid therethrough;

d. a second heat exchanger means connected to and located close to and/or in direct contact with the trigger reactor means, and adapted for flowing therethrough fluid whose higher energy level isomer has been converted to the isomer by said trigger-reactor means and for transfer of sensible heat therefrom to a material adapted for storage at an elevated temperature until desiring sensible heat therefrom and for the fluid containing the isomer flowing therethrough to proceed by a closed conduit to the first heat exchange means for flowing therethrough with transfer of sensible heat therefrom therein to fluid containing the higher energy level isomer.

7. The apparatus of claim 6 which includes in its circulatory system of a pump for providing forceful flow of the fluid.

8. The apparatus of claim 6 which includes in the trigger-reactor means, a means adapted to provide an initial imput of heat requisite to trigger and initiate the conversion of the higher energy level isomer to the isomer and a means to discontinue the initial imput upon the conversion providing the exothermic release of thermal energy in an amount greater than requisite to be self-sustaining and to maintain conversion of the higher energy level isomer to the isomer as it passes through the trigger-reactor means.

9. The apparatus of claim 6 in which the solar energy collector comprises only a single plate transmissive of solar radiation through which the solar radiation passes before striking the fluid containing the isomer.

10. The apparatus of claim 6 which includes in combination therewith an insulated storage tank for said material adapted for storage at elevated temperature.

11. The apparatus of claim 10 which includes in combination therewith from said storage tank of a heat exchanger and a conduit adapted to flow said material through the heat exchanger for providing a supply of heated water.

12. The apparatus of claim 10 which includes in combination therewith from said storage tank of a heat exchanger and a conduit adapted to flow said material through the heat exchanger for providing a supply of heated air.

13. The apparatus of claim 10 which includes in combination therewith from said storage tank of a conduit adapted to flow said material through a heat-powered absorption refrigeration apparatus to supply at least a portion of the heat imput required for operation of said refrigeration apparatus.

* * * * *

UNITED STATES PATENT OFFICE
CERTIFICATE OF CORRECTION

Patent No. 4004573                      Dated January 25, 1977

Inventor(s) Donald H. Frieling, Sherwood G. Talbert, Richard A. Nathan

It is certified that error appears in the above-identified patent and that said Letters Patent are hereby corrected as shown below:

Column 1, line 8, "592,020" should read ---592,029---.
Column 2, line 45, "eneergy" should read ---energy---.

Signed and Sealed this

*Fourth* Day of *October 1977*

[SEAL]

Attest:

RUTH C. MASON            LUTRELLE F. PARKER
*Attesting Officer*         *Acting Commissioner of Patents and Trademarks*